United States Patent Office 3,030,390
Patented Apr. 17, 1962

3,030,390
PROCESS FOR THE PREPARATION OF 4,17-ALPHA-DIHYDROXY-PROGESTERONE AND ITS ESTERS
Bruno Camerino, Milan, Umberto Valcavi, Varese, and Giovanni Sala and Giuliana Baldratti, Milan, Italy, assignors to Società Farmaceutica Italia, Milan, Italy, an Italian corporation
No Drawing. Filed Dec. 22, 1958, Ser. No. 781,945
Claims priority, application Great Britain Dec. 24, 1957
6 Claims. (Cl. 260—397.4)

The present invention provides 4,17alpha-dihydroxy-progesterone and esters thereof having the general formula

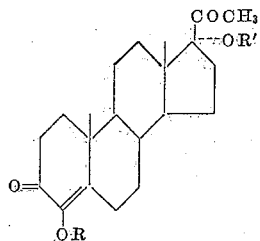

in which R and R' are the same or different and each represents hydrogen or an acylic group derived from an aliphatic carboxylic acid containing less than 9 carbon atoms, such for example as formic, acetic, propionic, butyric, valerianic, caproic, enantic, caprylic, cyclopentanepropionic and cyclohexaneacetic acids.

Preferred compounds provided by the invention are 4-hydroxy-17alpha-acetoxyprogesterone, 4,17alpha-diacetoxyprogesterone, 4-acetoxy-17alpha-hydroxyprogesterone and 4,17alpha-dihydroxyprogesterone-17-caproate.

The compounds of the invention may be prepared according to the processes illustrated by the following reaction schemes:

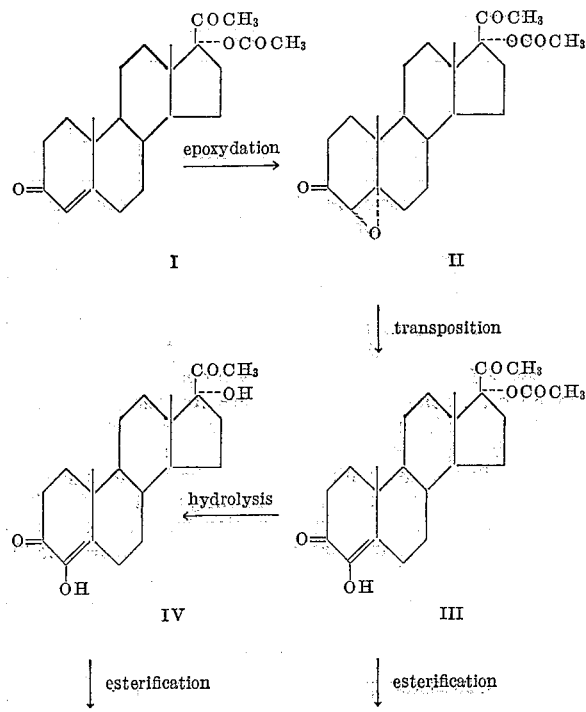

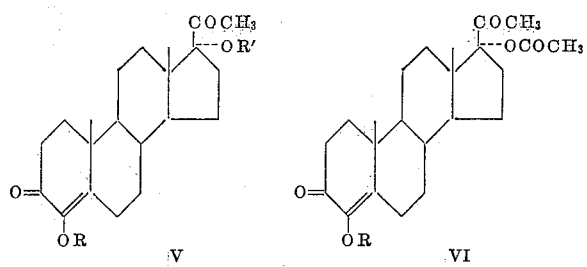

where R and R' are as defined above.

where R is as defined above but does not represent hydrogen.

The compounds of the present invention are conveniently prepared by reacting 17alpha-acetoxy-progesterone (I) dissolved in methanol, with hydrogen peroxide and alkalies for about 1 hour at +5° C. After acidification with acetic acid, dilution with water and filtration of the precipitate, 4,5-epoxy-17alpha-acetoxy-progesterone (II) is obtained, consisting of a mixture of 4,5beta- and 4,5-alpha-forms of the epoxide. The chemical structure of product II is demonstrated by elementary analysis and by the absence of absorption in the ultraviolet spectra at between 220 and 300/mμ and it is also confirmed by the fact that it gives the starting product again, i.e. 17alpha-acetoxy-progesterone, when heated with potassium iodide in acetic acid for 10 minutes.

In the second step of the synthesis of the compounds the mixture of 4,5beta- and 4,5alpha-epoxy-17alpha-acetoxy-progesterone (II) is reacted with concentrated $H_2SO_4$ and glacial acetic acid at room temperature for approximately 12 hours.

The reaction product is then isolated by dilution with water and filtration and is purified by recrystallization from methanol.

4-hydroxy-17alpha-acetoxy-progesterone (III) is thus obtained which can react in its tautomeric enolic and ketonic forms as follows

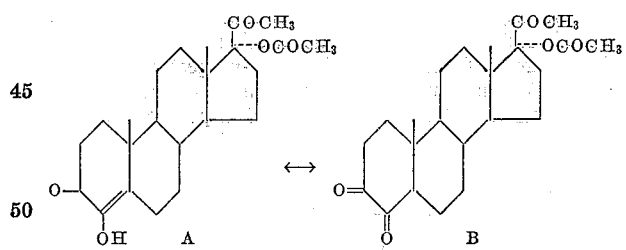

By hydrolysis of 4-hydroxy-17alpha-acetoxy-progesterone (III), for example with potassium carbonate dissolved in methanol and water, 4,17alpha-dihydroxy-progesterone (IV) is obtained. A 4,17alpha-diacyloxy-progesterone (V) may then be obtained by esterification at between 100° and 140° C. with the chloride or the anhydride of an aliphatic carboxylic acid, having less than 9 carbon atoms, preferably in the presence of a base or of an inert solvent containing a base or alternatively in the presence of p-toluene-sulphonic acid or of an inert solvent containing p-toluene-sulphonic acid.

By esterifying 4-hydroxy-17alpha-acetoxy-progesterone (III) under the above conditions with the chloride or anhydride of an aliphatic carboxylic acid having less than 9 carbon atoms, 4-acyloxy-17alpha-acetoxy-progesterone (VI) is obtained.

Alternatively 4,17alpha-dihydroxy-progesterone (IV) can be first acylated selectively in position 4, for instance with acetic anhydride and pyridine at room temperature to obtain 4-acetoxy-17alpha-hydroxy-progesterone (VII) which, by esterification under the above conditions, with the chloride or anhydride of an aliphatic carboxylic acid having less than 9 carbon atoms, will give a 4-acetoxy-17alpha-acyloxy progesterone (VIII).

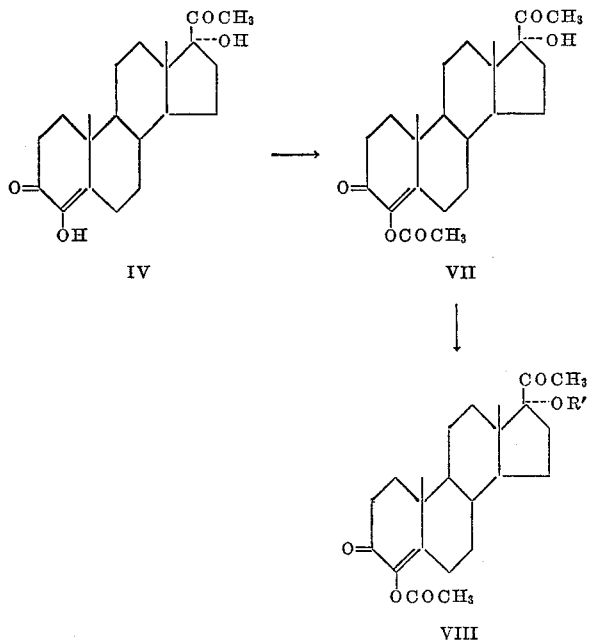

where R' is as defined above but is not hydrogen.

The compounds of the present invention can also be prepared by epoxydizing instead of the 17alpha-acetoxy-progestrone, any 17alpha-acyloxyprogesterone derived from an aliphatic carboxylic acid containing less than 9 carbon atoms, with hydrogen peroxide and alkalies and treating the mixture of 4,5beta- and 4,5alpha-epoxy-17alpha-acyloxy-progesterone thus obtained, with concentrated sulphuric acid and glacial acetic acid. In this way, for example, from 17alpha-hydroxy-progesterone caproate, 4,17alpha-dihydroxy-progesterone-17-caproate is obtained which can be further acylated in position 4.

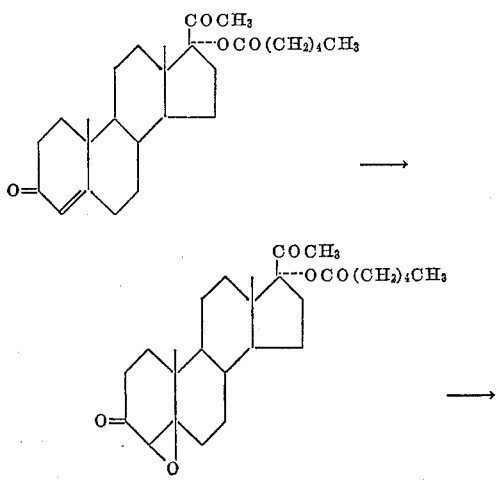

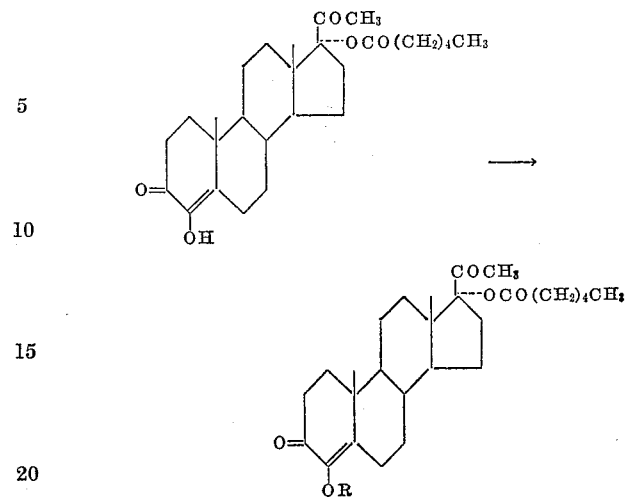

where R is as defined above but is not hydrogen.

The strong progestative activity of the compounds of the invention makes them useful in human therapy for the following diseases: primary amenorrhea, dismenorrhea, functional hypo-oligo-menorrhea, sterility, haemorrhage due to follicle persistence, haemorrhagic menorrhagia and metrorrhagia, habitual abortion, abortion menace and anti-ovulating action.

The following examples are given to illustrate the invention.

EXAMPLE 1

*4,17Alpha-Dihydroxy-Progesterone (IV)*

24 cc. 4 N sodium hydroxide and 40 cc. 130-vol hydrogen peroxide are added to 12 g. 17alpha-acetoxy-progesterone dissolved in 1.6 liters methanol and cooled to 15° C. The whole is kept in a refrigerator at +5° C. for 1 hour.

26.4 cc. glacial acetic acid are then added, the mixture is poured into 8 liters water and the precipitate, consisting of a mixture of 4,5beta- and 4,5alpha-epoxy-17alpha-acetoxy-progesterone having a melting point of 193–202° C. is filtered. The ultraviolet spectra of the product do not show any absorption at between 220 and 300 m$\mu$, and elementary analysis gives the following results:

|  | C | H |
|---|---|---|
| found, percent | 71.12 | 8.41 |
| for $C_{23}H_{32}O_5$ calculated, percent | 71.10 | 8.31 |

The chemical structure of the compound, which is obtained with a yield of 90%, is demonstrated by the fact that it gives again the starting compound, 17alpha-acetoxy-progesterone, when heated with KI for 10 minutes in acetic acid.

A solution of 6.7 cc. concentrated sulphuric acid in 28 cc. glacial acetic acid (pure for analysis) is added to 13.2 g. raw 4,5-epoxy-17alpha-acetoxy-progesterone dissolved in 66 cc. glacial acetic acid (pure for analysis). This mixture is left to stand overnight at room temperature and is then poured into 200 g. ice, while stirring and filtered while washing with water until the filtrate is neutral.

12.5 g. of a product having a melting point of 160–172° C. are obtained. By recrystallization from diluted methanol the melting point rises to 197–200° C.; $\epsilon 278 = 12.500$; it gives a blue color with a FeCl$_3$ solution.

|  | C | H |
|---|---|---|
| found, percent | 70.90 | 8.54 |
| for $C_{23}H_{32}O_5$ calculated, percent | 71.10 | 8.31 |

A solution of 1 g. potassium carbonate in 16 cc. water is added to 1 g. 4-hydroxy-17alpha-acetoxy-progesterone dissolved in 100 cc. methanol. The mixture is refluxed for 1 hour and then kept at room temperature; thereafter, it is diluted with water and filtered; 0.8 g. 4,17alpha-dihydroxy-progesterone with a melting point of 110–170° C. is obtained, which after double crystallization from methanol, appears as crystals having a melting point of 229–231° C.; ε278 is 11.800; it assumes a blue color when treated with a FeCl₃ solution.

|  | C | H |
|---|---|---|
| found, percent | 72.43 | 8.95 |
| for $C_{21}H_{30}O_4$ calculated, percent | 72.80 | 8.73 |

EXAMPLE 2

4,17Alpha-Diacetoxy-Progesterone 0.2 g. 4-hydroxy-17alpha-acetoxy-progesterone are dissolved in 1 cc. pyridine and 0.2 cc. acetic anhydride and left to stand overnight at room temperature. After dilution with water the mixture is filtered and the precipitate is washed until the filtrate is neutral. 220 mg. of a product with a melting point of 182–185° C. are obtained which, after recrystallization from methanol, yields 150 mg. of a product having a melting point of 201–203° C. and ε246=15.600.

EXAMPLE 3

4-Acetoxy-17Alpha-Hydroxy-Progesterone (VII)

3.2 g. 4,17alpha-dihydroxy-progesterone, dissolved in 25 cc. pyridine are acetylated with 3.5 cc. acetic anhydride at room temperature for 20 hours. This mixture is then poured into 100 g. ice and filtered; the precipitate is washed with water until the filtrate is neutral.

3.4 g. 4 acetoxy-17alpha-hydroxy-progesterone, with a melting point of 190–195° C. are obtained. By recrystallization from diluted methanol a product having a melting point of 195–198° C., ε246=15.400, is obtained.

|  | C | H |
|---|---|---|
| found, percent | 71.13 | 8.45 |
| for $C_{23}H_{32}O_5$ calculated, percent | 71.10 | 8.30 |

EXAMPLE 4

4,17Alpha-Diacetoxy-Progesterone 2 cc. cold 4 N sodium hydroxide solution and 3.3 cc. 130-vol. hydrogen peroxide are added at 20° C. to 1.1 g. 17alpha-hydroxy-progesterone caproate. The mixture is left to stand in a refrigerator at +5° C. for 3 hours. 2.2 cc. glacial acetic acid are then added, the mixture is poured into 800 cc. water and extracted 4 times, each time with 200 cc. ether. The ether extracts are dried, and filtered and the solvent is evaporated.

The oily residue, consisting of a mixture of 4,5beta- and 4,5alpha-epoxy-17alpha-hydroxy-progesterone caproate, is taken up again wtih ethylic ether and then with petroleum ether. 1.15 g. of a product is obtained, which has a melting point of 115–120° C., does not show any absorption at between 220 and 300 mμ in its ultraviolet spectrum and is used as such for the next step.

A cold solution consisting of 1 cc. glacial acetic acid and 0.25 cc. concentrated sulphuric acid is added to 500 mg. raw 4,5-epoxy-17alpha-hydroxy-progesterone caproate dissolved in 2.5 cc. glacial acetic acid.

After standing at room temperature for 18 hours the mixture is poured into 10 g. ice, the liquid portion is decanted off and the residue, slurried with water, gives a pasty solid weighing 450 mg.

After repeated crystallization from methanol, 4,17-alpha-dihydroxy-progesterone-17-caproate, having a melting point of 141° C., is obtained.

This substance yields a blue color when treated with a FeCl₃ solution and its ultraviolet spectrum presents an absorption peak at 278 mμ(ε=12.700).

Pharmacological Activity of 4-Hydroxy-17Alpha-Acetoxy-Progesterone and of 4,17Alpha-Diacetoxy-Progesterone The progestative activity of these products has been ascertained by subcutaneous and oral application to a female rabbit, weighing 800–1000 g., previously treated with extradiol according to McPhail's method (J. Physiol. 83, 145, 1934). The results obtained are given in the following table.

As standard dosage there were used 0.5 mg. and 1 mg. progesterone administered by subcutaneous injection.

| Steroid | method | total dosage, mg. | uterus weight, mg. | proliferation degree according to McPhail |
|---|---|---|---|---|
| progesterone | subcutaneously | 0.5 | 1662.6 | 2.5 |
|  | do | 1 | 2068.2 | 3.7 |
| 17alpha-acetoxy-progesterone | per os | 1 | 1129.7 | 0.57 |
|  | do | 2 | 1686.4 | 2.1 |
|  | subcutaneously | 1 | 2219.7 | 4 |
| 4-hydroxy-17alpha acetoxy-progesterone | subcutaneously | 0.5 | 2289.9 | 3.7 |
|  | do | 1 | 2624.8 | 4 |
|  | per os | 0.5 | 1405.4 | 3.4 |
|  | do | 1 | 2212.4 | 3 |
| 4,17alpha-diacetoxy-progesterone | subcutaneously | 0.5 | 3770.0 | 4 |
|  | per os | 0.5 | 1764.3 | 2.5 |
|  | do | 1 | 2218.2 | 4 |

As is apparent from this table the new 4,17alpha-dihydroxy-progesterone derivatives display a strong progestative activity which when administered subcutaneously is at least twice as high as that of progesterone.

They are active also when administered per os and when so administered they appear to be at least twice as active as progesterone when administered subcutaneously. The 4-hydroxy-17alpha-acetoxy-progesterone is 8–10 times more active when administered per os and twice as active when administered subcutaneously than 17alpha-acetoxy-progesterone.

Although acyl radicals of unsubstituted monocarboxylic acid are preferred, it is within the broader purview of the disclosure to employ acyl radicals of mono- and polycarboxylic saturated and unsaturated aliphatic acids which may have monovalent substituents.

We claim:

1. A compound of the group consisting of 4,17alpha-dihydroxy-progesterone and its esters of the formula:

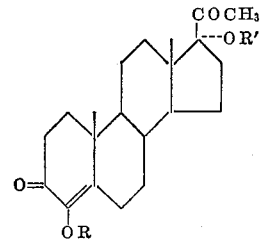

where R and R' are taken from the group consisting of hydrogen and acyl radicals of an aliphatic carboxylic acid containing less than 9 carbon atoms.

2. 4,17alpha-dihydroxy-progesterone.
3. 4-hydroxy-17alpha-acetoxy-progesterone.
4. 4,17alpha-diacetoxy-progesterone.
5. 4-acetoxy-17alpha-hydroxy-progesterone.
6. 4,17alpha-dihydroxy-progesterone-17-caproate.

(References on following page)

References Cited in the file of this patent

UNITED STATES PATENTS

| | | |
|---|---|---|
| 2,727,912 | Colton | Dec. 20, 1955 |
| 2,919,286 | Levy et al. | Dec. 29, 1959 |
| 2,933,510 | Julian et al. | Apr. 19, 1960 |

OTHER REFERENCES

Camerino et al.: "Il Farmaco" (Pavia), Ed. Sci. vol. 11 (1956), pages 579–85 relied on, C.A., vol. 51, par. 2008(e).

Junkman: "Naunyn-Schmiedebergs Arch. Exptl. Path. Pharmakol (1954), vol. 223 pages 244–253 relied on or Chem. Abstracts (1955) par. 512(i).